Nov. 18, 1969
A. C. KELSALL
3,479,143
MEANS FOR CONDUCTING ENDOTHERMIC
CATALYTIC REACTIONS, INCLUDING
ELECTRICAL HEATING MEANS
Filed July 13, 1964
2 Sheets-Sheet 1
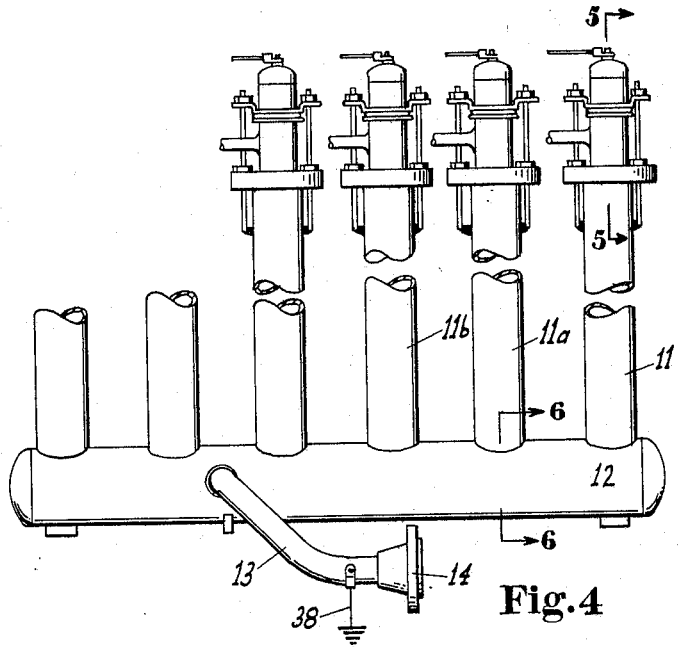
Fig.4
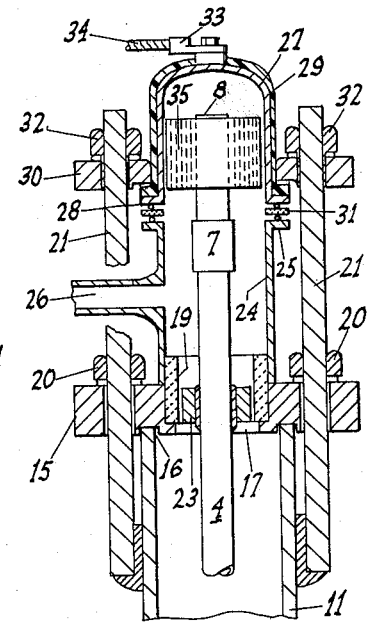
Fig.5
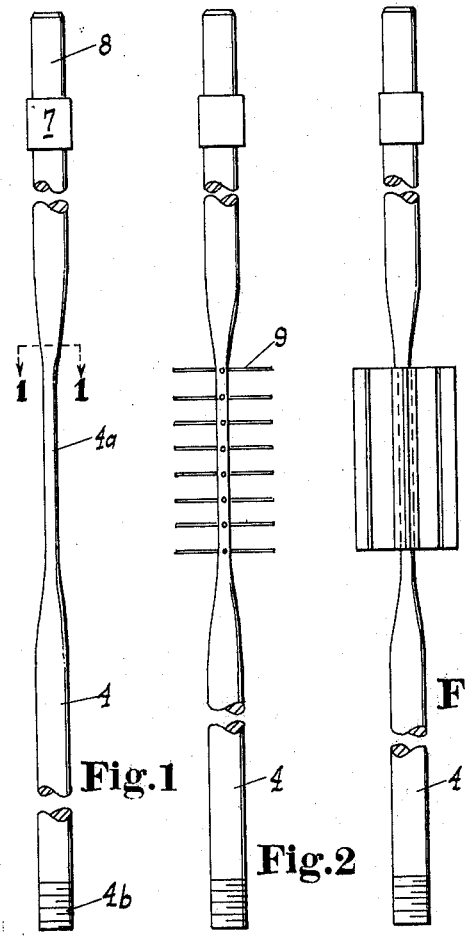
Fig.1  Fig.2  Fig.3
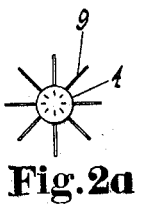
Fig.1a
Fig.2a
Fig.3a
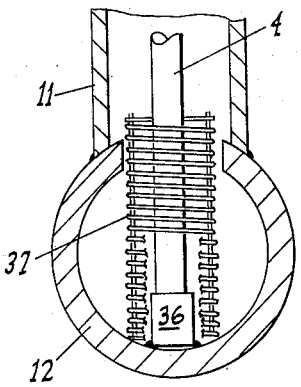
Fig.6
INVENTOR.
AVERY CROWELL KELSALL,
BY Youngblut, Melville,
Strasser & Foster,
ATTORNEYS.

Nov. 18, 1969  A. C. KELSALL  3,479,143
MEANS FOR CONDUCTING ENDOTHERMIC
CATALYTIC REACTIONS, INCLUDING
ELECTRICAL HEATING MEANS
Filed July 13, 1964  2 Sheets-Sheet 2
Fig. 7
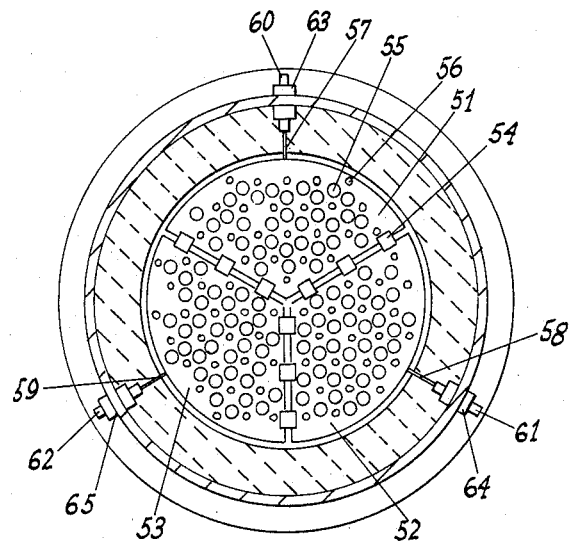
Fig. 11
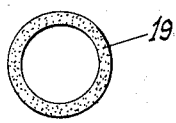
Fig. 8
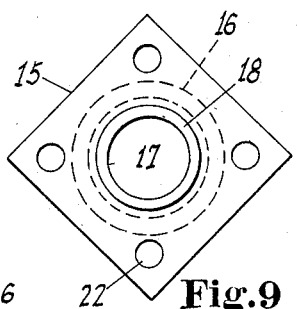
Fig. 9
Fig. 10
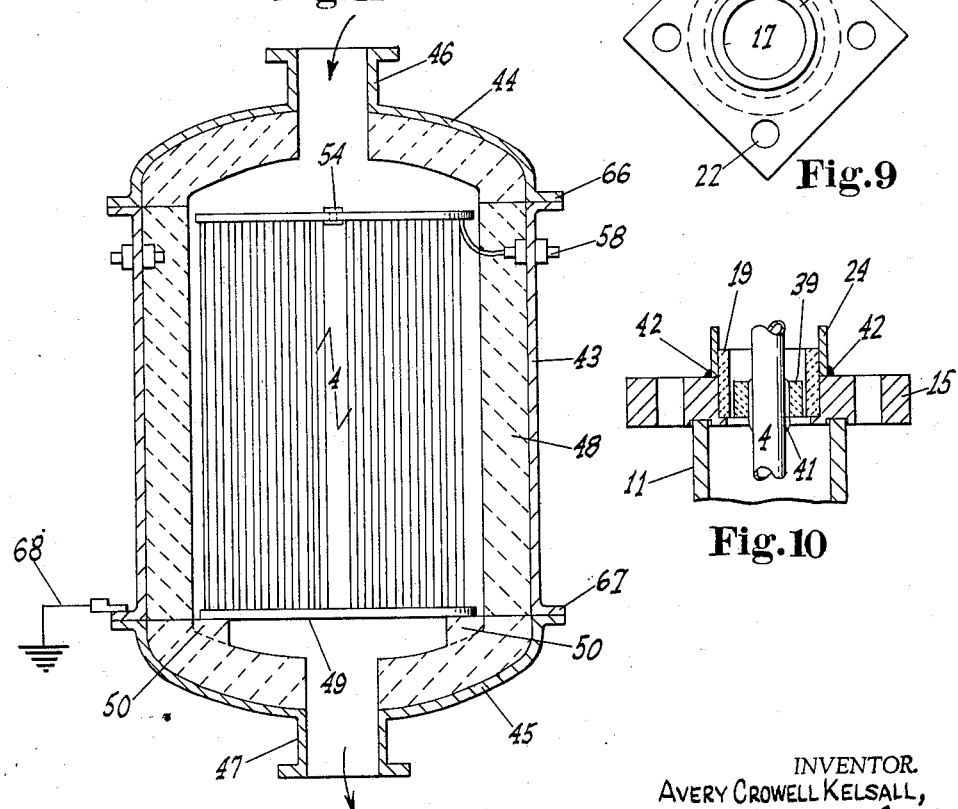
Fig. 12
INVENTOR.
AVERY CROWELL KELSALL,
BY *Youngblut, Melville,*
*Strasser & Foster*
ATTORNEYS.

—

United States Patent Office 3,479,143
Patented Nov. 18, 1969

3,479,143
MEANS FOR CONDUCTING ENDOTHERMIC CATALYTIC REACTIONS, INCLUDING ELECTRICAL HEATING MEANS
Avery Crowell Kelsall, Louisville, Ky., assignor to Girdler Corporation, Louisville, Ky., a corporation of Ohio
Filed July 13, 1964, Ser. No. 382,209
Int. Cl. B01j 9/04
U.S. Cl. 23—288                                    9 Claims

ABSTRACT OF THE DISCLOSURE

In means for conducting endothermic catalytic reactions, an elongated vessel to contain catalyst, with means at its respective ends for the entrance of gaseous reactants and for the exit of gaseous reaction products. At least one elongated electrical heating element located within the vessel and surrounded by the catalyst. Means for supplying current to the heating element to produce heat for the endothermic reaction, the heating element being configured in different portions of its length to produce different quantities of heat and having a necked-down portion within the section surrounded by catalyst.

---

In carrying on endothermic reactions, it is generally necessary to supply energy in the form of heat to the substances in the reaction zone. There are many kinds of endothermic chemical reactions, and without any intention of limiting the invention thereto, but merely for the purpose of setting forth the invention in an exemplary embodiment, it will hereinafter be described for use in connection with reforming reactions between gaseous or vaporized reactants such as result in the conversion of methane or higher hydrocarbons into gaseous mixtures consisting primarily of hydrogen and carbon monoxide. The reformation reaction is frequently carried on in the presence of steam. In some instances a partial combustion takes place within the reaction zone so that reformed gases in addition to their primary content of hydrogen and carbon monoxide may also include relatively smaller quantities of carbon dioxide, water vapor, methane and inert gases. These matters do not constitute limitations upon the invention.

Where gaseous or vaporized substances are introduced into a vessel wherein a reforming reaction is to take place, a very large quantity of thermal energy is desirably added at first in order to bring the process reactants rapidly up to the operating temperature. But as the heated reactants continue through the vessel, a substantial further quantity of thermal energy will be necessary to satisfy the reaction requirements and for the maintenance of the reaction temperature. As the reaction approaches equilibrium conditions, a progressively smaller quantity of thermal energy input will be needed to maintain the reaction temperature.

It may be stated that for any given reaction program there will be in theory a desired gradient of heat energy input at successive points in the passage of the gaseous reactants through the reaction zone. If the temperature is allowed to fall appreciably below the theoretical optimum level at any point, the speed or completion of the reaction will be impaired. The reformer will not operate with the utmost efficiency since it will be necessary either to reduce the quantitative flow of the reactants or to accept a lower degree of reaction between them. If on the other hand an excessive energy input is allowed to occur at any point, the temperature there may rise beyond the maximum for which the apparatus and the catalyst are suited. The effectiveness of the catalyst may be impaired and under some circumstances dangerous conditions of operation may arise. Hitherto it has been the practice to locate tubes or vessels containing the desired catalytic material in a furnace or equivalent heat exchange device, pass the gaseous reactants through the tubes or vessel and rely on the transmission of thermal energy to the reactants by conduction or radiation or both. As indicated above it is sometimes the practice to bring about a partial combustion which, being an exothermic reaction, liberates some heat. No doubt other heating means could have been chosen without the exercise of invention; but the difficulty has been that whatever the immediate source of thermal energy or the means for its transmission to the reactants, the entire furnace tends to assume a common temperature. This is especially true in high capacity furnaces where a large thermal energy release per unit of furnace volume is generally employed. The result is that portions of the reaction zone which require a large thermal energy input, and other portions which require only a relatively small thermal energy input, are both subjected to what amounts to the same thermal environment.

It is an object of this invention to provide means creating an environmentf or endothermic reactions wherein the temperatures can be controlled very accurately with respect to different parts of the said environment.

It is an object of the invention to provide a means for transmitting to the reactants definite prearranged quantities of thermal energy and at prearranged and selected locations, and to do this in a manner substantially independent of any furnace environment as such.

The term "furnace" as used herein means a housing which is insulated and refractory lined, and within which are located both a vessel or vessels within which an endothermic reaction may be carried on, and sources of heat. The heat sources may be fuel burners, the products of combustion of which are not commingled with the reactants but instead are vented to a stack. The furnace may have other heat generating means such as electric heating elements. In some instances, as where a source of gas or fluid at high temperature is available, the furnace may incorporate heat exchange means in lieu of burners or the like. But the use of furnaces as defined frequently gives rise to difficulties. For example, aboard military craft of any kind, a furnace constitutes a heavy and bulky piece of apparatus which tends to be of fragile character. Moreover, furnaces themselves are subject to their own thermal losses; and this constitutes an energy requirement over and above that of the endothermic reaction itself. The use of a furnace chamber with sources of thermal energy therein has an effect on the nature and material of the forming vessel since the vessel must withstand not only the desired reaction temperature but also the higher temperature within the furnace enclosure. Moreover, where the reactants in the vessel are to be heated by conduction through the vessel walls, which in turn are generally heated by radiation or convection or both from the heat sources within the furnace, then the choice of materials for the reaction vessel is still further retsricted by the necessity for high heat conductivity.

It is an object of this invention to provide means for the heating of the reactants which means do not include the reaction vessel.

It is an object of the invention to provide a heating means which does not require a heating of the reaction zone from any source or sources outside the reaction vessel.

Hence it is an object of the invention to provide reaction means for the purposes set forth where there need be no furnace as above defined.

It is an object of the invention to provide a structure which may be employed in connection with a furnace, the furnace acting to maintain an over-all temperature in the reaction zone, and the device including the heating means of this invention acting to provide additional localized increments of temperature in parts only of the reaction zone.

It is an object of the invention to provide a type of heating means which can perform its function while in contact with the catalytic material.

It is an object of the invention to simplify and render less expensive reforming means as hitherto known in the art, while providing for complete control of the temperature in all parts of the reaction zone.

These and other objects of the invention which will be set forth hereinafter or will be apparent to one skilled in the art upon reading these specifications, are accomplished by that certain structure and arrangement of parts of which exemplary embodiments will now be described. Reference is made to the accompanying drawings wherein:

FIG. 1 is an elevational view of a heating element of this invention.

FIG. 1a is a transverse section thereof taken along the section line 1—1 of the first mentioned figure.

FIGS. 2 and 2a and FIGS. 3 and 3a similarly show modified structures.

FIG. 4 is a partial elevational view of a structure for use in a furnace and involving catalyst tubes in the form of a harp.

FIG. 5 is a partial sectional view of the upper end of a harp tube, incorporating the heating element of this invention taken along the section line 5—5 of FIG. 4.

FIG. 6 is a partial sectional view of the lower end of a harp tube incorporating the heating means of this invention taken along the section line 6—6 of FIG. 4.

FIGS. 7, 8 and 9 are respectively plan views of elements employed in the construction shown in FIG. 5.

FIG. 10 is a fragmentary sectional view illustrating certain details of the structure of FIG. 5.

FIGS. 11 and 12 are respectively horizontal and cross sectional views of an arrangement including a vessel for containing catalysts and the heating means of this invention.

Briefly in the practice of this invention use is made of an elongated electrical heating means which (as a unitary device) is capable of producing thermal energy in different quantities along its length. Specifically, use is made of the phenomenon that the conversion of electrical energy to thermal energy along the length of the heating element will be greatest where the cross sectional area of the element is smallest. In the preferred practice of the invention the heating means can be configured along its length to match the thermal energy requirements of the reforming vessel in which it is placed. Thus, for example, where the reforming vessel is considerably elongated it is entirely possible to place within it one or more of the heating means of this invention, so configured as to supply thermal energy in the largest quantity at the entrance end of the reaction vessel so as to heat up the mixed reactants to the reacting temperature as quickly as possible, so configured throughout the greater part of its length as to supply thermal energy to the reacting mixture in such quantity as to maintain it at the reaction temperature, and also so configured near its opposite end as to supply substantially less thermal energy at a time when the reactants have attained substantial equilibrium.

As a further aid in avoiding excessive local temperatures, thermal fins or other radiating means can be attached to the heating device to provide for increasing energy dispersion at locations of high heat release.

Referring first to FIG. 1, there is shown a heating element 4 of elongated form and made of an electrically conductive material, preferably though not necessarily a metal, having sufficient electrical resistivity to become heated upon the application of current. In order to make an exemplary showing herein, the heating element is shown in the form of an elongated rod which has been necked down as at 4a. This configuration is exemplary merely of configurations which may be used; but in view of the explanation above the skilled worker in the art will understand how the element 4 may be configured throughout its length or in selected portions thereof so as to convert electrical energy into thermal energy in varying quantities as desired.

The element 4 has been shown threaded at one end as at 4b. The other end may also be threaded and is shown as connected by a coupler 7 to a contact element 8 later described. FIGS. 2, 2a, 3 and 3a similarly illustrate heating elements according to the invention but having radiating means on the necked portion. Like parts have been given like index numerals. The heating element of FIG. 2 is characterized in its reduced portion by radially extending rods 9 welded or otherwise attached thereto in good thermal contact. Similarly the structure of FIG. 3 is illustrated as having radially extending sheet metal radiating vanes 10 attached to it for a similar purpose.

The heating elements of FIGS. 1, 2 and 3 are intended for use in a reaction vessel which is or includes a catalyst chamber. In many reforming furnaces, catalytic material is contained in a series of vertically extending tubes 11, 11a and 11b as shown in FIG. 4 of this case. These tubes are connected at their bottom ends to a manifold 12, the tubes being parallel with each other and forming what is commonly termed a "harp" in the industry. The harp will be located (perhaps with other harps) in a suitable furnace, the details of which form no limitation on this invention. As showing furnaces of a type which may be used, reference is made to the copending applications of Robert M. Reed et al. Ser. No. 287,572, filed June 13, 1963 and entitled Apparatus for High Temperature Endothermic Catalytic Reactions, now abandoned, and the application of Henry Carl Herp et al., Ser. No. 377,942 filed June 25, 1964 and entitled Modular Reformer Furnace.

The manifold 12 of the harp illustrated in FIG. 4 has an outlet means or conduit 13 with a coupling 14, the conduit and coupling being located outside the furnace. The vertical tubes 11, 11a and 11b are filled with suitable catalytic material. There are means hereinafter described for introducing the mixed reactants into the top portions of the tubes; and the skilled worker in the art will understand that as the mixed gaseous reactants travel downwardly in the tubes the reformation reaction takes place catalytically so that the reformed gases together with incidental impurities may be removed through the conduit 13.

The construction at the top portion of the tubes 11 is best appreciated from FIG. 5. The upper end of the tube is surmounted by a plate 15 the underside of which is grooved as at 16 to accept the tube end. The plate also has a central perforation 17 with a stepped configuration 18 open upwardly (see FIG. 9).

A ceramic ring 19 rests on the stepped ledge 18 of the perforation 17 and serves as insulative means as later described. The plate 15 is held in place by nuts 20 engaging threaded rods 21 which extend through perforations 22 in the plate, their lower ends being welded as shown to the upper end portion of the harp tube 11.

The ceramic ring 19 (see also FIG. 8) serves to insulate the heating element 4 from the tube 11 and to keep it centered. To this end use may be made of a spider 23 which is crimped or otherwise fastened on the heating element 4 and lies within the hollow of the ceramic ring 19.

Resting on the upper side of the plate 15 there is a metallic fitting 24 having a flange 25 at its upper end. The fitting has a lateral connection 26 for conduit means permitting the entrance of the mixed reactants into the fitting and thence through the ceramic ring into the tube 11.

Above the fitting 24 there is a dome-shaped metallic element 27 having a flange 28 at its lower end. This element including its flange is covered with a layer 29 of phenolic resin or other insulative substance. Plate element 30 which has a central perforation engages above the flange portion of the last mentioned insulative substance and serves to hold the flange 28 of the dome 27 down onto the flange 25 of the fitting 24 with the interposition of a ceramic or other sealing washer 31 and suitable sealing rings therebetween. The holding down is accomplished through a construction in which the rods 21 heretofore described pass through openings in the plate 30 and are provided with nuts 32.

At the top of dome 27 there is a means 33 in the nature of an electrical connector whereby current may be supplied to the dome by a cable 34. Within the dome there is an electrical contactor 35 connecting the element 8 with the dome. Preferably this is of flexible material to permit expansion of the heating element 4.

Referring now to FIG. 6 it will be seen that the tube 11 is welded to the manifold 12 and opens into it. The heating element 4 is shown with its lower threaded end engaged in a coupling member 36 welded or otherwise fastened to the inside bottom portion of the manifold 12. A wire cage or similar element 37 is shown as surrounding the lower end of the heating element 4, and the purpose of this construction is to keep catalyst within the tube 11 from falling into the manifold 12.

Assuming the harp of FIG. 4 to be located within a furnace so as to be heated by radiation therein, the skilled worker in the art will understand that a mixture of the gaseous reactants introduced at 26 will travel downwardly through the tube 11 which is filled with catalyst particles of appropriate size (not shown) during which time it will be reformed. The reformed gases can be withdrawn from the manifold 12 through the exit means 13. At the same time the heating element 4 may be caused not only to generate heat by the application of electrical current thereto, but also to generate heat at different rates and temperatures throughout its length as heretofore described, greatly increasing the efficiency of the reaction. The electrical circuit for applying power to the heating element 4 comprises the cable 34, connector 33, dome 27, connector 35 and element 8 at the top end of the heating element. The lower end of the heating element is of course connected to the manifold 12 which in turn may be connected to the other terminal of a source of current or to ground as indicated at 38 in FIG. 4. This type of connection will suffice where single phase current is employed; but where three-phase power is available the leads for the several phases may be connected respectively to the connectors and cables shown at the tops of the tubes 11, 11a and 11b etc. in FIG. 4. In a preferred type of furnace the plate 15 would lie at about the level of the furnace roof so that the actual gas inlet and electrical connecting means extend above the furnace roof.

FIG. 10 shows a somewhat modified construction. Instead of a spider or centering fin device as shown in FIG. 7 use may be made of an inner ceramic ring 39 fitted with an inner metallic grommet or the like of a size to slip over the heating element 4. The grommet may be welded to the heating element as indicated at 41. This structure will serve the purposes of the invention so long as there is sufficient clearance between the inner ceramic ring 39 and the outer ceramic ring 19 to permit the passage of the gases or vaporized constituents at the desired flow rate. FIG. 10 also illustrates that the fitting 24 may be soldered, brazed or welded to the plate 15 as shown at 42.

In FIGS. 11 and 12 there is shown an apparatus for conducting endothermic reactions, which apparatus does not require a furnace as such. There is a tubular body comprising a sleeve 43 and end caps 44 and 45. These elements are provided with mating flanges as shown, the flanges being fastened together by bolts, rivets, welding or in any other way known to the art. The upper cap member 44 has an inlet fitting 46 which may be connected to the source or sources of the vaporized ingredients to be reformed, and the lower cap element 45 has an outlet fitting 47 through which the reformed gases pass. The entire inner surface of the body is lined with refractory 48, preferably of heat insulative as well as electrically insulative character.

Near the bottom of the vessel a plate 49 rests upon bosses 50 preferably formed of the insulative material. The plate 49 is foraminous in character so that gaseous products may pass through it on their way to the outlet fitting 47. A plurality of the heating elements hereinabove described extend between the plate 49 and one or more upper plates which are also perforated for the passage of gaseous materials. In the particular embodiment the upper plate is supported by the heating elements 4. If a single upper plate and a single lower plate are employed all of the heating elements will be connected in parallel when electrical contact is made to the plates respectively. The lower plate serves also as a catalyst support, the perforations in it being smaller than the normal sizes of the catalyst pellets; and it will be understood that the entire interior of the vessel between the plates will be filled with the catalyst.

In many instances it will be found desirable to use three-phase alternating current. In this event the upper plate will be made up of three segment-shaped portions 51, 52 and 53. These portions may be held in separated but coplanar condition by insulative spacing means 54 which may be and preferably are ceramic in character. Each of the segment-shaped portions of the upper plate are provided with perforations 55 for the passage of gases; and the heating elements 4 preferably extend through the plate segments as indicated at 56 and are fastened thereto for good electrical contact in any desired way as by riveting, welding, threading or the like.

In the three-phase structure illustrated in FIGS. 11 and 12 there will be an electrical cable 57, 58 or 59 connected at one end to one of the segments of the upper plate and at the other end to a lead-through conductor 60, 61 or 62 passing through the body wall 43 of the device and insulated therefrom by suitable insulating means 63, 64 and 65. The skilled worker in the art will understand that the lead-through structures may be any of those current in the art for similar problems, e.g. electrical connections through transformer means, or electrical connections through the casings of sealed motor-compressor-condenser devices in mechanical refrigeration; and it goes without saying that the lead-throughs may be so made as to be gas-tight per se and to be resistant to any desired degree of super atmospheric pressure if the reformation reaction is to be done under pressure.

In the structure shown in FIGS. 11 and 12, either of the single-phase or triple-phase types, the upper cap element 44 or the lower cap element 45 may be removed from the body 43 by separation at the mating flanges 66 or 67, whereupon the entire interior arrangement including the lower plate, the heating elements and the upper plate or plates together with the catalyst filling may be removed as such for cleaning, replacement or repair. In the structure shown in these figures the body 43 may be elongated to whatever extent is deemed necessary for the proper carrying on of the endothermic reaction; but all of the heat energy input required for the purposes set forth above and neglecting any preheating of the gases before their entry into the reformation reaction chamber, will be derived from the heating elements 4 as distinguished from any external source of heat energy input such as a furnace. For safety the vessel may be grounded electrically as indicated at 68 in FIG. 12.

Modifications may be made in the invention without departing from the spirit of it.

The invention having thus been described in certain exemplary embodiments, what is desired to be secured by Letters Patent is as follows:

1. Means for conducting endothermic catalytic reactions comprising an elongated vessel, an elongated catalyst bed within said vessel, means at one end of said vessel for the entrance of gaseous reactants, means at the other end of said vessel for the exit of gaseous reaction products, at least one elongated electrical heating element located within said vessel and extending longitudinally thereof, a portion of said electrical heating element extending through and surrounded by said elongated catalyst bed, means for supplying current to said electrical heating element whereby to produce heat for said endothermic reaction, said portion of said electrical heating element extending through said catalyst bed being configured in different portions of its length to produce different quantities of heat, whereby to produce a temperature gradient in said catalyst bed, said electrical heating element comprising a rod-like element having a necked-down portion at least at one position in said portion of its length within said catalyst bed.

2. The structure claimed in claim 1, wherein said vessel is an elongated tube, the said electrical heating element extending substantially axially of said tube, the said tube being one of a series of catalyst tubes attached to an opening into a manifold at one end, the said tubes forming a harp, each tube having an axially located electrical heating element as claimed, one end of each of said electrical heating elements being attached to said manifold so that said manifold can act as a terminal for supplying current to one end of said electrical heating element.

3. The structure claimed in claim 1, wherein said vessel is an elongated tube, the said electrical heating element extending substantially axially of said tube, the said tube being one of a series of catalyst tubes attached to an opening into a manifold at one end, the said tubes forming a harp, each tube having an axially located electrical heating element as claimed, one end of each of said electrical heating elements being attached to said manifold so that said manifold can act as a terminal for supplying current to one end of said electrical heating element, gas pervious means at the opposite ends of said tubes for insulating said electrical heating elements therefrom, dome-like means at the last mentioned ends of said tubes including means for the entrance of said gaseous reactants, said means for supplying current to said electrical heating elements comprising electrical conductor means extending through said dome-like means, and insulated from said tubes, said means for the exit of gaseous reaction products comprising an outlet connection to said manifold.

4. The structure claimed in claim 1 wherein said rod-like electrical heating element is provided with thermally conductive radiating elements on said necked-down portion.

5. The structure claimed in claim 1, wherein said elongated vessel contains a plurality of said electrical heating elements in substantially parallel positions.

6. The structure claimed in claim 5, wherein said elongated vessel is internally heat insulated.

7. The structure claimed in claim 6, wherein said electrical heating elements are divided into three groups, the elements of each of said groups being connected together electrically at one end, and means for effecting electrical contact separately with the heating elements of each of the three groups at the opposite end so that the said group of heating elements may be energized by three-phase alternating current.

8. The structure claimed in claim 7, wherein the said heating elements are connected together at their first mentioned ends by a metallic plate extending across the said vessel and perforated for the passage of gases therethrough, and wherein the groups of electrical heating elements have their opposite ends respectively connected with mutually insulated segments of another metallic plate also perforated for the passage of gaseous reaction products therethrough.

9. The structure claimed in claim 8, wherein said vessel has a filling of catalyst surrounding said electrical heating elements and supported by the first mentioned plate.

References Cited

UNITED STATES PATENTS

| | | | |
|---|---|---|---|
| 1,371,299 | 3/1921 | Claude | 23—288.8 XR |
| 1,938,124 | 10/1930 | Stevens | 48—65 XR |
| 2,163,599 | 6/1939 | Houdry | 23—288.4 |
| 2,432,934 | 12/1947 | Rasor | 23—288.8 XR |
| 2,670,426 | 5/1952 | Stone | 13—20 XR |

MORRIS O. WOLK, Primary Examiner

D. G. CONLIN, Assistant Examiner

U.S. Cl. X.R.

13—20; 23—289